(12) United States Patent
Showalter et al.

(10) Patent No.: US 7,354,092 B2
(45) Date of Patent: Apr. 8, 2008

(54) GOLF CART ENCLOSURE

(75) Inventors: Jerry M. Showalter, Wesley Chapel, FL (US); Cary B. Showalter, Tampa, FL (US)

(73) Assignee: Tampa G Manufacturing Co., Inc., Tampa, FL (US)

( * ) Notice: Subject to any disclaimer, the term of this patent is extended or adjusted under 35 U.S.C. 154(b) by 273 days.

(21) Appl. No.: 11/013,656

(22) Filed: Dec. 16, 2004

(65) Prior Publication Data

US 2006/0290163 A1   Dec. 28, 2006

(51) Int. Cl.
B60J 1/00 (2006.01)
(52) U.S. Cl. .................................................. 296/77.1
(58) Field of Classification Search ................ 296/77.1
See application file for complete search history.

(56) References Cited

U.S. PATENT DOCUMENTS

| | | | |
|---|---|---|---|
| 1,444,413 A | 2/1923 | Collins | |
| 1,505,955 A | 8/1924 | Herron | |
| 3,709,553 A | 1/1973 | Churchill et al. | 296/28 |
| 4,013,315 A | 3/1977 | West | 296/83 |
| 4,098,536 A | 7/1978 | Mills | 296/78 |
| 4,621,859 A | 11/1986 | Spicher | 296/78 |
| 4,652,037 A * | 3/1987 | Thau et al. | 296/77.1 |
| 4,773,694 A * | 9/1988 | Gerber | 296/77.1 |
| D332,437 S | 1/1993 | Lay, Jr. | D12/156 |
| 5,203,601 A | 4/1993 | Guillot | 296/77.1 |
| 5,217,275 A * | 6/1993 | Ridge | 296/77.1 |
| 5,259,656 A * | 11/1993 | Carroll | 296/77.1 |
| 5,310,235 A | 5/1994 | Seymour et al. | 296/77.1 |
| D355,403 S | 2/1995 | Eberle | D12/402 |
| 5,388,881 A | 2/1995 | Spencer et al. | 296/77.1 |
| 5,393,118 A | 2/1995 | Welborn | 296/147 |
| 5,588,690 A * | 12/1996 | Showalter | 296/77.1 |
| D385,420 S | 10/1997 | Hislop et al. | D3/320 |
| 5,688,018 A | 11/1997 | Simpson | 296/138 |
| 5,788,317 A * | 8/1998 | Nation | 296/141 |
| 5,890,507 A | 4/1999 | Hinsperger | 135/96 |
| 5,915,399 A * | 6/1999 | Yang | 135/88.01 |
| D413,283 S | 8/1999 | Stepp et al. | D12/16 |
| 5,975,613 A * | 11/1999 | Sippel | 296/77.1 |
| 6,007,134 A | 12/1999 | Weston | 296/83 |
| 6,158,801 A | 12/2000 | Tucker | 296/146.1 |
| 6,206,446 B1 | 3/2001 | Slayden | 296/77.1 |
| 6,206,447 B1 | 3/2001 | Nation | 296/77.1 |
| 6,419,303 B1 | 7/2002 | Fleming | 296/190.01 |
| 6,530,617 B2 | 3/2003 | McElwee et al. | 296/77.1 |
| 6,547,304 B1 | 4/2003 | Conner et al. | 296/79 |
| RE38,272 E | 10/2003 | Nation | 296/77.1 |
| 6,659,211 B2 | 12/2003 | Esposito | 180/65.1 |
| 6,663,158 B1 | 12/2003 | Showalter | 296/96.21 |
| 6,663,162 B1 * | 12/2003 | Tyrer | 296/100.14 |
| 6,773,052 B1 * | 8/2004 | Tyrer | 296/100.11 |
| 6,776,445 B1 | 8/2004 | Conner et al. | 296/79 |

(Continued)

*Primary Examiner*—H Gutman
(74) *Attorney, Agent, or Firm*—Holland & Knight LLP

(57) ABSTRACT

A golf cart enclosure for removable installation about a golf cart or similar vehicle to protect the occupants thereof from precipitation such as rainfall. The enclosure comprises a front, rear and/or side panels suspended about the periphery of the roof structure of the golf cart. One or more panel pockets are positioned about the periphery of the roof structure immediately above one or more of the panel(s) such that they be rolled-up into a bight and inserted into their respective panel pocket for storage.

10 Claims, 4 Drawing Sheets

U.S. PATENT DOCUMENTS

| | | | |
|---|---|---|---|
| 6,805,396 B2 | 10/2004 | True et al. | 296/100.14 |
| 7,147,263 B2 * | 12/2006 | Schneidau et al. | 296/77.1 |
| 2004/0239140 A1 * | 12/2004 | Feinberg | 296/77.1 |
| 2006/0113817 A1 * | 6/2006 | Gasper | 296/77.1 |

\* cited by examiner

FIG. 2
FIG. 2A
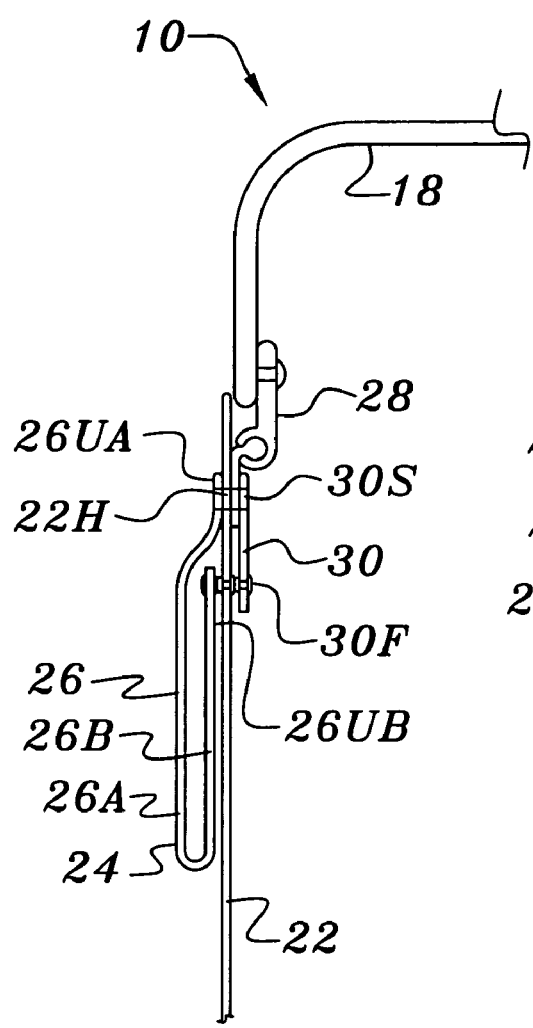
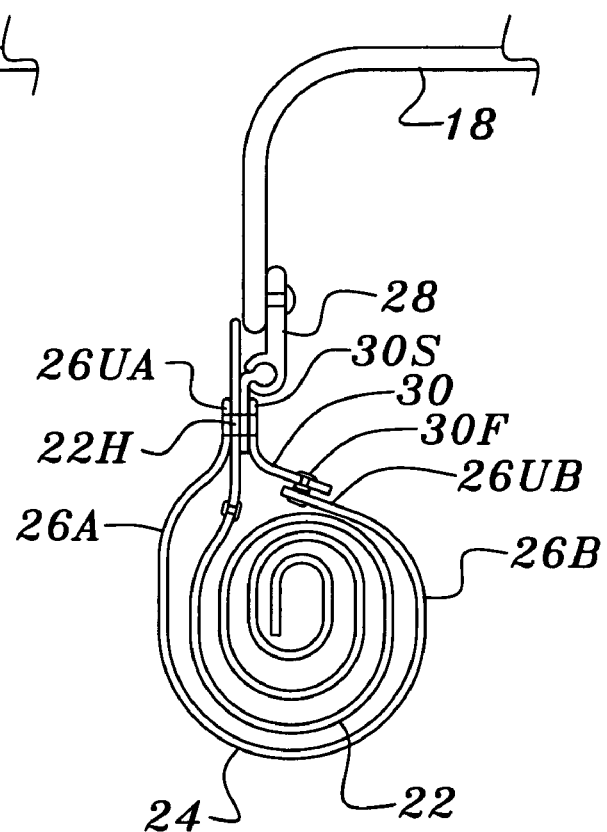

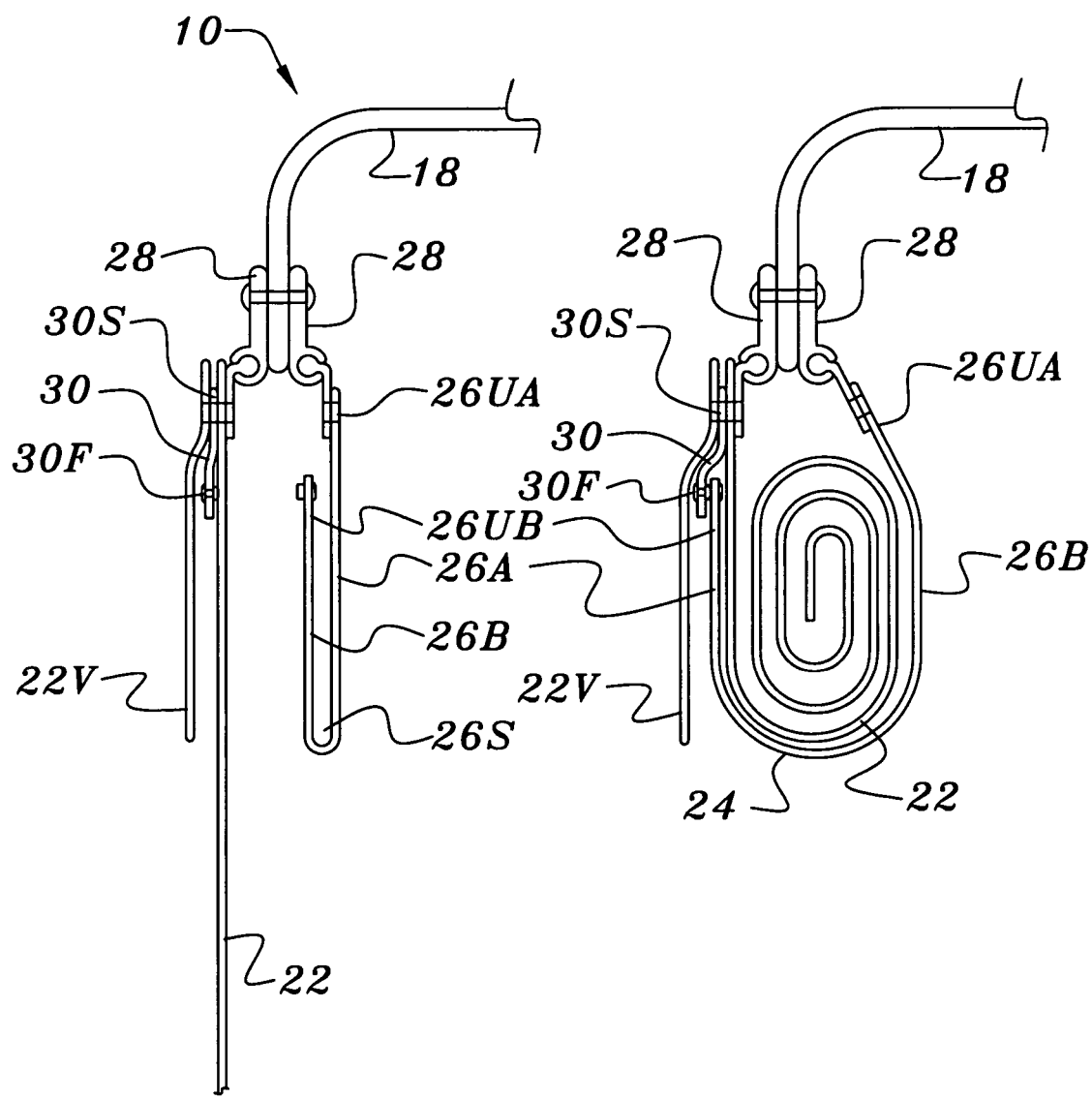

GOLF CART ENCLOSURE

BACKGROUND OF THE INVENTION

1. Field of the Invention

This invention relates to golf carts and similar vehicles. More particularly, this invention relates to golf cart enclosures comprising front, rear and/or left and right side panels composed at least partly of transparent or translucent materials that are suspended about the periphery of the golf cart from the roof structure to the undercarriage thereto to protect the occupants of the golf cart from inclement weather such as cold and precipitation.

2. Description of the Background Art

Presently, there exist many types of golf cart enclosures designed to protect the occupants of the golf cart from inclement weather such as precipitation such as rain or cooler temperatures in the winter months. Basically, these types of golf cart enclosures each comprises one or more curtains or panels, typically formed at least in part of sheets of translucent or transparent materials, which are suspended from the roof structure to hand downwardly to the undercarriage of the golf cart. Commonly, a rear panel and left and right side panels are provided; however, unless the golf cart is fitted with a hard windshield, a front panel serving as a windshield may also be provided. To allow passenger ingress and egress and to allow access to the golf clubs stored at the rear of the golf cart, the panels are commonly secured to either to adjacent panels by zippers or similar fasteners or to the vertical side posts that support the roof structure.

Historically, many patents have taught panels for golf carts that protect the occupants from inclement weather. For example, U.S. Pat. No. 3,709,533 (the disclosure of which is hereby incorporated by reference herein) discloses a golf cart enclosure comprising a pair of transparent side panels slidably suspended from a curtain mechanism affixed to the peripheral underside of the roof structure of a golf cart. The side panels each extend around one-half of a golf cart and are affixed together at adjoining edges at the front and rear of the golf cart by means of snap fasteners. Similar snap fasteners are provided about the lower peripheral edge of the undercarriage of the golf cart to more securely retain the side curtain panels in their closed position about the periphery of the golf cart.

U.S. Pat. No. 4,013,315 (the disclosure of which is hereby incorporated by reference herein) discloses similar side panels positioned about the peripheral sides of a golf cart and secured into position by means of suction cups removably fastened to the roof of the cart. Finally, U.S. Pat. No. 4,098,536 (the disclosure of which is hereby incorporated by reference herein) discloses still another golf cart enclosure composed essentially of a unitary structure designed to be placed over the roof of a golf cart with its side panels extending downwardly about the periphery of the golf cart. A zippered opening is provided to allow ingress and egress to the golf cart.

All of the above-listed golf cart enclosures functioned to protect the occupants in the event of precipitation or inclement weather. However, during good weather conditions, the enclosures were cumbersome to store in such manner that the enclosures do not interfere with the free ingress and egress to the golf cart or otherwise obstruct the open air view of the occupants of the golf cart. Specifically, the enclosures disclosed in the first two mentioned patents contemplate sliding the panels leftwardly or rightwardly in a curtain fashion whereupon tie straps are used to tie the curtains together about the upstanding roof supports of the golf cart. While both enclosures may eventually be removed from the curtain assembly or from the roof structure by means of the suction cups, respectively, such removal procedures are time consuming. The enclosure disclosed in U.S. Pat. No. 4,098,536 may entirely be removed from a golf cart in an apparent quick and easy manner. However, in regard to all three types of enclosures, once the enclosures are removed, the bulky material constituting the enclosures must be stored somewhere on or in the cart for subsequent use. Storage of such bulky material is usually cumbersome or otherwise interferes with the otherwise roomy and unobstructed open air view of the golf cart.

U.S. Pat. No. 4,773,694 (the disclosure of which is hereby incorporated by reference herein), assigned to the assignee of this application, was a marked improvement to the above-listed prior art golf cart enclosures. Specifically, the novel feature of our prior invention comprised peripheral flaps positioned about the periphery of the roof panel of the enclosure which allows each panel suspended therefrom to be folded and rolled upwardly in a bight and then tucked under the roof panel whereupon the flap is then fastened to the rim of the golf cart. Complete roll up and tuck-in of each panel about the periphery of the roof panel of the enclosure resulted in the entire enclosure being stored on top of the roof structure of a golf cart where it is completely out of the way of the occupants of the vehicle, thereby not obstructing the view of the occupants or otherwise interfering with their free movement. Moreover, in the event of imminent inclement weather, the bights of rolled-up panels could be quickly unfolded from under the peripheral flaps of the roof panel of the enclosure and suspended therefrom to protect the occupants from precipitation. Further, should the enclosure become soiled or otherwise require cleaning, the entire enclosure may be quickly and easily removed from the roof structure of the cart for cleaning and then quickly and easily reinstalled.

U.S. Pat. No. 4,773,694 has been a commercial success in the golf cart industry. Many other patentable improvements have been, at least in part, developed based upon U.S. Pat. No. 4,773,694. Specifically, other prior art golf cart and related enclosures patents (the disclosures of which are hereby incorporated by reference herein) citing U.S. Pat. No. 4,773,694 include:

U.S. Pat. No. 6,805,396 Cover for the rear bag compartment of a golf cart

U.S. Pat. No. 6,776,445 Golf cart cover, components therefor and methods of making the same U.S. Pat. No. 6,547,304 Golf cart cover, components therefor and methods of making the same U.S. Pat. No. 6,530,617 Frame with canvas cover for all-terrain vehicle U.S. Pat. No. 6,419,303 Cab enclosure for a self-propelled earth moving machine U.S. Pat. No. 6,206,447 Golf cart frame enclosure attachment device U.S. Pat. No. 6,206,446 ATV all-weather cab U.S. Pat. No. 6,158,801 Vehicle enclosure U.S. Pat. No. 6,007,134 Portable golf cart weathershield system U.S. Pat. No. 5,975,613 Stroller shading device U.S. Pat. No. D413,283 Removable side windows U.S. Pat. No. 5,915,399 Multipurpose cover for car U.S. Pat. No. 5,890,507 Portable shelter for releasable attachment to a snowblower, walker or other walking implement U.S. Pat. No. 5,788,317 Dual paneled golf cart enclosures U.S. Pat. No. 5,688,018 Protective cover for golf bags on a golf car U.S. Pat. No. 5,393,118 Aluminum framed vinyl closure for golf carts U.S. Pat. No. 5,388,881 Portable golf cart cover and method of manufacture therefor U.S. Pat. No. D355,403 All terrain vehicle cab U.S. Pat. No. 5,310,235 Golf cart weathershield U.S. Pat. No. 5,259,656 Golf cart enclosure U.S. Pat. No. 5,217,275 Golf cart cover U.S. Pat. No. 5,203,601 Frame and cover for wheeled vehicle U.S. Pat. No. D332,437 Combined article cab and rod bar safety cage While U.S. Pat. No. 4,773,694 has been widely commercialized, more contemporary golf cart utilize roof structures have integral gutter system that drain precipitation such as rain through the vertical roof supports. Hence, golf cart enclosures with roof panels are not optimally used with such roof structures since they cover the entirety of the roof including the integral gutter system. Precipitation such as rain then simply runs off the roof panel instead of draining through the integral gutter system. Therefore, there exists a need in the golf cart industry for a golf cart enclosure that allows the panels to be rolled-up into a bight and stored about the periphery of the roof structure without obstructing the integral gutter system of the roof structure of the golf cart.

Therefore, it is an object of this invention to provide an apparatus which overcomes the aforementioned inadequacies of the prior art devices and provides an improvement which is a significant contribution to the advancement of the golf cart enclosure art.

Another object of this invention is to provide a golf cart enclosure having suspended translucent or transparent panels to protect the occupants of the golf cart from precipitation.

Another object of this invention is to provide a golf cart enclosure which may be easily mounted to the roof structure of a typical golf cart and left in place without obstruction or interference with the open air view of the occupants.

Another object of this invention is to provide a golf cart enclosure including front and side panels and/or rear or front panels suspended from the roof structure of a golf cart which may be simply rolled up into a bight and stored about the periphery of the roof structure during good weather conditions and then during inclement weather, simply unrolled from about the periphery of the roof structure to protect the occupants of a golf cart from precipitation.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a golf cart enclosure for removable installation about a golf cart or similar vehicle to protect the occupants thereof from precipitation such as rainfall. More particularly, the enclosure comprises a front, rear and/or side panels suspended about the periphery of the roof structure of the golf cart to enclose the golf cart to protect the occupants thereof from inclement weather such as cold or precipitation.

The peripheral suspension of the panels from the roof structure is achieved by connecting the uppermost edge of the panels relative to the roof structure or, less preferably, providing roof panel having a configuration substantially the same as the configuration of the roof structure and then connecting the uppermost edge of the panels to respective peripheral edges of the roof panel. The panels are configured to allow passenger ingress and egress from the golf cart. For example, the vertical edges of the panels may be connected to the vertical roof supports by any of the known fastening techniques. An exemplary fastening technique is disclosed in U.S. Pat. No. 5,975,615 (the disclosure of which is hereby incorporated by reference herein) assigned to the assignee of this application. Also, by way of example, for adjacent panels, the vertical edges thereof may be connected to each other by zippers or similar fasteners.

The novel feature of this invention comprises one or more panel pockets positioned about the periphery of the roof structure immediately above one or more of the panel(s) that can be rolled-up into a bight and inserted into the panel pocket for storage. More particularly, each panel pocket comprises a generally U-shaped elongated configuration that defines the panel pocket for receiving the bight(s) of the rolled-up panel(s). Preferably, the U-shaped configuration of each panel pocket comprises an elongated length slightly greater than the width(s) of the panel(s) intended to be stored therein. One of the upper elongated edges of the U-shaped elongated configuration of the panel pocket is connected relative to the outer periphery of the roof structure with the other upper elongated edge being left unconnected to define the panel pocket, open along one edge, for receiving the bight(s) of panel(s).

During use, each panel may be folded and rolled upwardly into a bight and then tucked into its respective panel pocket. Complete roll up and tuck in of each panel into its panel pocket about the periphery of the roof structure results in all of the panels being stored up and out of the way of the occupants of the vehicle, thereby not obstructing the view of the occupants or otherwise interfering with their free ingress or egress. Moreover, in the event of imminent inclement weather, the rolled up panels may be quickly removed from their respective panel pockets, unrolled and suspended to protect the occupants from precipitation.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is a cross-sectional view of FIG. 1 along lines 2-2 illustrating the cross-sectional configuration of the first embodiment of the exterior panel pocket and the manner for connecting an upper edge thereof to the upper hem of the panel so that it faced inwardly and connected relative to the periphery of the roof structure and FIG. 2A illustrates the panel pocket filled with a panel that has been rolled-up into a bight and stored therein;

FIG. 4 is a cross-sectional view similar to that of FIG. 2 illustrating the cross-sectional configuration of the third embodiment of the panel pocket positioned interiorly and facing outwardly and the manner for connecting an upper edge thereof to the periphery of a roof structure and FIG. 4A illustrates the panel pocket filled with a panel that has been rolled-up into a bight and stored therein.

Similar reference characters refer to similar parts throughout the several views of the drawings.

DETAILED DESCRIPTION OF THE PREFERRED EMBODIMENT

Figure 1:
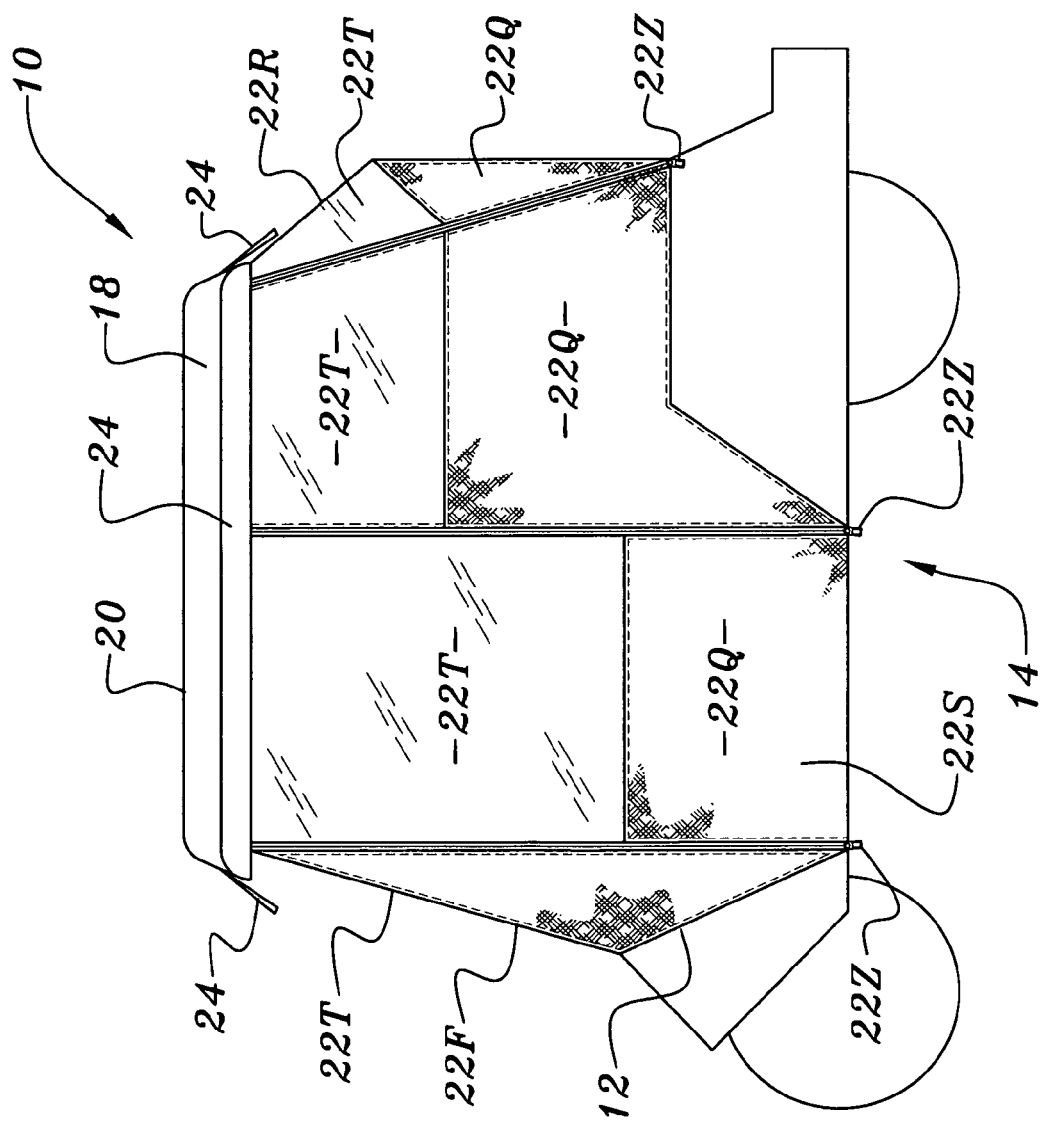
FIG. 1 is a side view of the golf cart enclosure of the invention showing the panel pockets connected relative to the periphery of the roof structure of a conventional golf cart (shown in phantom)
Figure 3:
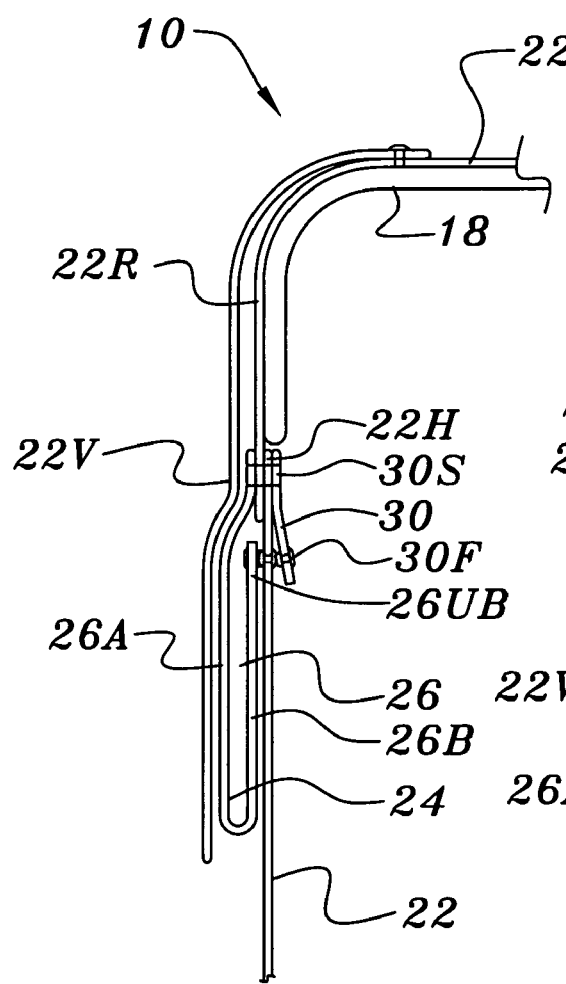
FIG. 3 is a cross-sectional view similar to that of FIG. 2 illustrating the cross-sectional configuration of the second embodiment of the inwardly-facing, exterior panel pocket and the manner for connecting an upper edge thereof to the periphery of a roof panel positioned atop the roof structure
Figure 3A:
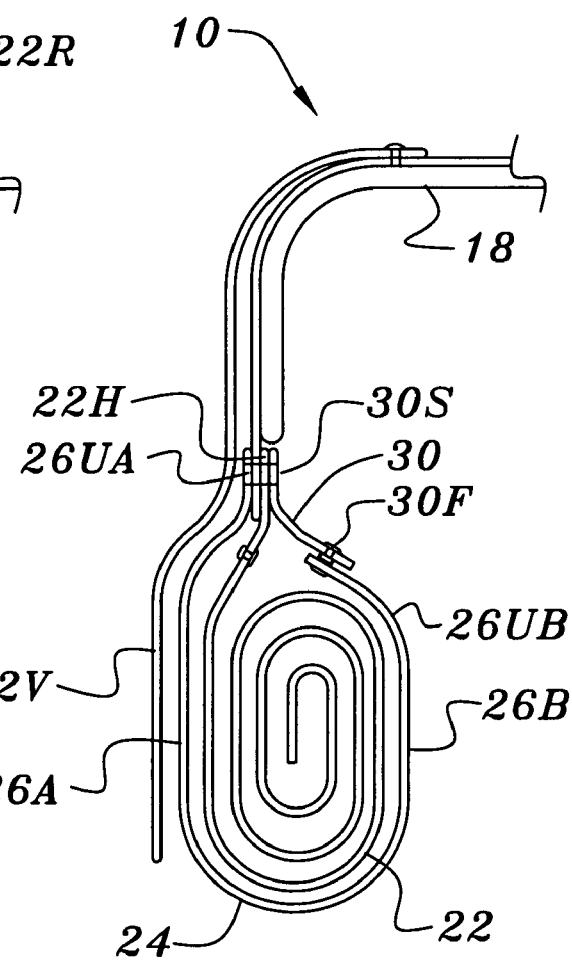
FIG. 3A illustrates the panel pocket filled with a panel that has been rolled-up into a bight and stored therein.

Referring to FIG. 1, the golf cart enclosure 10 of the invention is designed to be fitted to a conventional golf cart, generally indicated by numeral 12, to protect the occupants thereof from inclement weather such as precipitation. More particularly, a conventional golf cart 12 typically comprises a wheeled carriage 14 having four vertical roof supports 16 supporting a roof structure 18. With reference to FIG. 2, one type of a roof structure 18 comprises a generally flat cross-sectional configuration with a gutter system 20 positioned about its periphery that drains through a downspout (not shown) formed internally within one of more of the vertical roof supports 16. With reference to FIG. 3, another type of roof structure 18 comprises a generally flat cross-sectional configuration without the gutter system 20. The present invention is applicable to both the gutter and gutterless roof structures 18.

The golf cart enclosure 10 of the invention may include one or more panels 22 such as, without limitation, a front panel 22F serving as a windshield protecting the front of the golf cart 12, a rear panel 22R for protecting the rear of the golf cart 12 and optionally one or more sets of golf clubs stored in the rear, and left and right side panels 22S for protecting the side of the golf cart 13. The panels 22 may comprise a single sheet of material or one or more subpanels sewn together. For example, the side panels 22S may be composed of an upper transparent subpanel 22T and a lower opaque subpanel 22Q that are sewn together. The panels 22 may be sectionalized. For example, side panel 22S may comprise two adjacent sections—a front seat section and a rear section. The vertical edges of the panels 22 and the sections thereof may be fastened together to each other or to an adjacent vertical roof support. For example, side panels 22S composed of two sections may be fastened together along their vertical edge such by any suitable fastener such as a zipper 22Z or a releasable hook and loop fastener such as Velcro. The present invention is applicable to all types and arrangements of panels 22.

The present invention comprises one or more panel pockets 24 positioned relative about the periphery of the roof structure 18 immediately above one or more of respective panel(s) 22 that can be rolled-up into a bight and inserted into the panel pocket 24 for storage. The panel pockets 24 may be composed of any suitable material such as, without limitation, vinyl, laminated vinyl, fabric, laminated fabric or mesh material.

More particularly, as shown in FIGS. 2, 3 and 4, each panel pocket 24 comprises a generally U-shaped elongated configuration 26, preferably composed of either two sheets of side material sewn along their bottom edge 26S (see FIG. 4) or one sheet of folded material forming sides of material 26A and 26B, that defines the panel pocket 24 for receiving the bight of the rolled-up panel 24. The upper edge 26UA of one of the sides of material 26A is connected relative to the outer periphery of the roof structure 18.

As shown in FIG. 2, the upper edge 26UA of the material 26A forming the U-shaped configuration 26 of the panel pocket 24 may be sewn to the upper hem 22H of the panel 22. The upper hem 22H of the panel 22 is removably connected to the peripheral edge of the roof structure 18 by any suitable fastener such as by a bead formed in the hem 22H that slides into a C-shaped bracket 28 mounted to the peripheral edge of the roof structure 18.

Alternatively, as shown in FIG. 3, the golf cart enclosure 10 of the invention may include a roof panel 22R and the upper edge 26UA of the U-shaped configuration 26 of the panel pocket 24 may be then sewn to the upper hem 22H of the panel 22 and that is itself sewn to the peripheral edge of the roof panel 22R.

As shown in FIG. 4, the upper edge 26UA of the material 26A may be directly connected to the peripheral edge of the roof structure 18 by a bead formed in its own hem that slides in a separate C-shaped bracket 28 mounted to the peripheral edge of the roof structure 18.

As shown in FIGS. 2 and 3, it should therefore be appreciated that the panel pocket 24 may be supported relative to the periphery of the roof structure 18 indirectly by the upper hem 22H of the panel 22 or by the roof panel 22R, or as shown in FIG. 4, may be directly connected to the roof structure by a fastener such as the bracket 28 or the like.

As noted above, each panel pocket 24 comprises a generally elongated configuration slightly greater in length than the width of the panel 22 that is to be rolled-up into a bight and stored therein. Alternatively, one or more of the panel pockets 24 may be designed with an elongated length slightly greater than two or more of the panels 22 or sections thereof aligned therebelow. For example as shown in FIG. 1, a single long panel pocket 24 for the side of the golf cart enclosure 10 may store the side panel 22S formed in two sections.

For longer elongated lengths of the panel pocket 24, one or more mid supports 30 may be provided to supporting the upper peripheral edge 26UB of the other side of material 26B. Specifically, a mid support 30 may comprise any form that provides support to the upper peripheral edge 26UB of the material 26B forming the panel pocket 24. One preferred form comprises a strap 30S that is sewn at one end to the upper hem 22H of the panel 22 and that is removably connected at its other end to the upper peripheral edge 26UB by a fastener 30F such as a snap fastener.

As shown in FIGS. 1, 2 and 3, the panel pocket 24 is preferably faced inwardly and positioned exteriorly over the respective panel(s) 22 that are to be stored therein. By being positioned exteriorly over the respective panels 22 and facing inwardly, the pockets 24 are substantially precluded from collecting debris and precipitation. However, without departing from the spirit and scope of this invention, it should be appreciated that, as shown in FIG. 4, the panel pocket 24 may alternatively be positioned interiorly of the respective panels 22 and reversed to face outwardly. As shown in FIGS. 3 and 4, any of these embodiments may include a separate valance 22V which may be sewn to the roof panel 22R or to the hem 22H of panel 22 and dimensioned to extend downwardly to conceal the pocket 24.

In each of the embodiments, if the panel 22 is of a trapezoidal configuration (wider at the bottom than the top), the panel 22 may be folded vertically in from its sides to be of a uniform-width equal to or less than the panel pocket 24 into which it is to be stored. The panel 22 is then rolled upwardly into a bight and then tucked into its respective panel pocket 24 and the mid support 30 (if present) fastened to hold-up and secure the upper edge 26UB of the U-shaped configuration 26.

During imminent inclement weather, such as precipitation, the panels 22 or sections thereof may be individually lowered by simply unfastening the mid support 30 (if present), removing the bight from the panel pocket 24 and unrolling the bight until the panel 22 is completely suspended from about the periphery of the roof structure 18.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,

What is claimed is:

1. An enclosure for a golf cart or other vehicle having a roof structure secured above a body portion of the vehicle, the enclosure comprising in combination:

at least one panel having a first width suspended relative to the outer periphery of the roof structure;

at least one pocket having a second width at least equal to said first width suspended relative from said outer periphery of the roof structure to be positioned adjacent to an upper portion of said panel for storing said panel when said panel is rolled-up into a bight and the bight inserted into said pocket.

2. The enclosure as set forth in claim 1, wherein said pocket is positioned exteriorly of said panel.

3. The enclosure as set forth in claim 2, wherein said pocket is positioned to face inwardly.

4. The enclosure as set forth in claim 1, wherein said pocket is positioned interiorly of said panel.

5. The enclosure as set forth in claim 4, wherein said pocket is positioned to face outwardly.

6. The enclosure as set forth in claim 1, wherein an upper edge of said pocket is connected to said panel.

7. The enclosure as set forth in claim 1, further including a roof panel.

8. The enclosure as set forth in claim 7, wherein an upper edge of said pocket is connected to said roof panel.

9. The enclosure as set forth in claim 1, further including a bracket affixed to said roof structure from which said panel is suspended.

10. The enclosure as set forth in claim 1, further including a bracket affixed to said roof structure from which said pocket is suspended.

* * * * *